United States Patent
Koshizuka et al.

(10) Patent No.: US 9,515,479 B2
(45) Date of Patent: *Dec. 6, 2016

(54) INRUSH CURRENT SUPPRESSION APPARATUS

(75) Inventors: Tadashi Koshizuka, Saitama (JP); Shiro Maruyama, Yokohama (JP); Hiroyuki Maehara, Fuchu (JP); Yoshimasa Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 425 days.

This patent is subject to a terminal disclaimer.

(21) Appl. No.: 13/800,029

(22) PCT Filed: Sep. 20, 2011

(86) PCT No.: PCT/JP2011/071328
§ 371 (c)(1),
(2), (4) Date: Mar. 13, 2013

(87) PCT Pub. No.: WO2012/039373
PCT Pub. Date: Mar. 29, 2012

(65) Prior Publication Data
US 2013/0300215 A1 Nov. 14, 2013

(30) Foreign Application Priority Data
Sep. 22, 2010 (JP) .................. 2010-212624

(51) Int. Cl.
H02H 9/00 (2006.01)
H01H 9/56 (2006.01)
H01H 33/59 (2006.01)

(52) U.S. Cl.
CPC ............ *H02H 9/005* (2013.01); *H01H 9/563* (2013.01); *H01H 33/593* (2013.01); *Y10T 307/858* (2015.04)

(58) Field of Classification Search
CPC .... Y10T 307/858; H02H 9/005; H01H 33/593
(Continued)

(56) References Cited

U.S. PATENT DOCUMENTS

| 8,008,810 B2 | 8/2011 | Kinoshita et al. | |
|---|---|---|---|
| 8,310,106 B2 | 11/2012 | Koshiduka et al. | |
| 2009/0134862 A1* | 5/2009 | Kinoshita et al. | 323/361 |

FOREIGN PATENT DOCUMENTS

| CN | 1558482 A | 12/2004 |
|---|---|---|
| CN | 101563744 A | 10/2009 |

(Continued)

OTHER PUBLICATIONS

Notification of the First Office Action mailed by China Patent and Trademark Office on Aug. 5, 2014 in the corresponding Chinese patent application No. 201180030459.0—41 pages.

(Continued)

*Primary Examiner* — Rexford Barnie
*Assistant Examiner* — Thai Tran
(74) *Attorney, Agent, or Firm* — Knobbe, Martens, Olson & Bear LLP

(57) ABSTRACT

According to one embodiment, there is provided an inrush current suppression apparatus that suppresses an inrush current generated when shunt capacitors are connected to a power system, the apparatus including a voltage measurement unit measuring power source voltages, a current measurement unit measuring circuit breaker currents, a polarity determination unit determining the polarities of residual voltages, a phase section detector detecting a phase section in which the polarities of the residual voltages match the polarities of the power source voltages, and a circuit breaker closing unit closing the circuit breaker within the phase section.

10 Claims, 8 Drawing Sheets

(58) Field of Classification Search
USPC .................................. 307/130; 323/355, 908
See application file for complete search history.

(56) References Cited

FOREIGN PATENT DOCUMENTS

| | | |
|---|---|---|
| CN | 101647169 A | 2/2010 |
| JP | 2002-075145 A | 3/2002 |
| JP | 2006-324125 A | 11/2006 |
| JP | 2007-305491 A | 11/2007 |
| JP | 2007305491 A * | 11/2007 |
| JP | 2008-153037 A | 7/2008 |
| JP | 2008-160100 A | 7/2008 |
| JP | 2010-073666 A | 4/2010 |
| WO | WO 2012/124474 A1 | 9/2012 |

OTHER PUBLICATIONS

International Search Report date Dec. 27, 2011 of PCT/JP2011/071328 which is the parent application.
International Preliminary Report on Patentability issued by WIPO on Apr. 16, 2013 in the corresponding PCT patent application No. PCT/JP2011/071328.

* cited by examiner

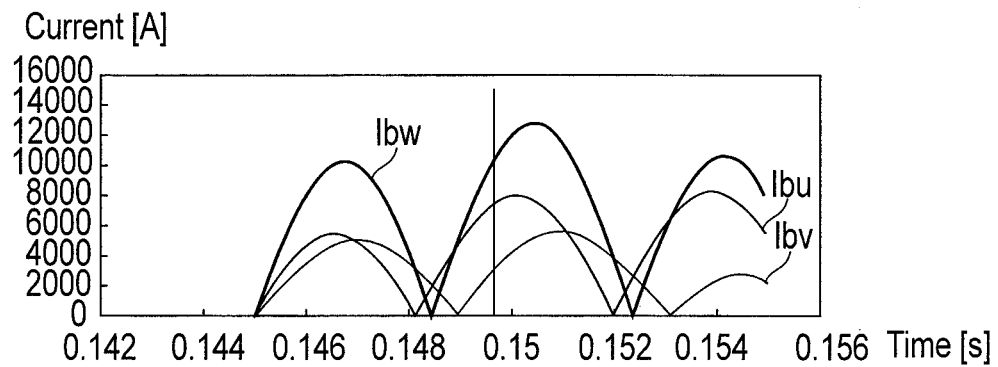
F I G. 9
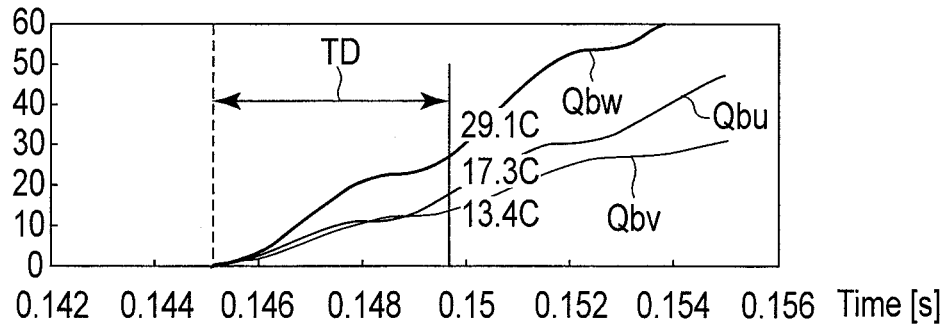
F I G. 10

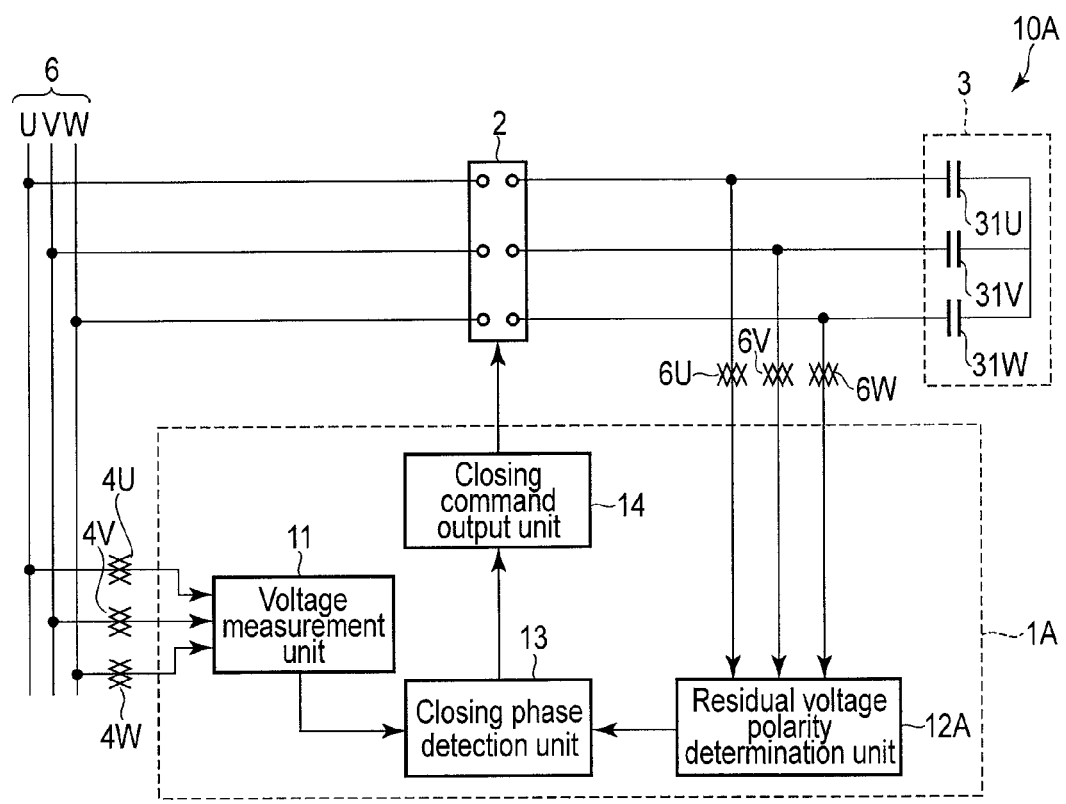
F I G. 11

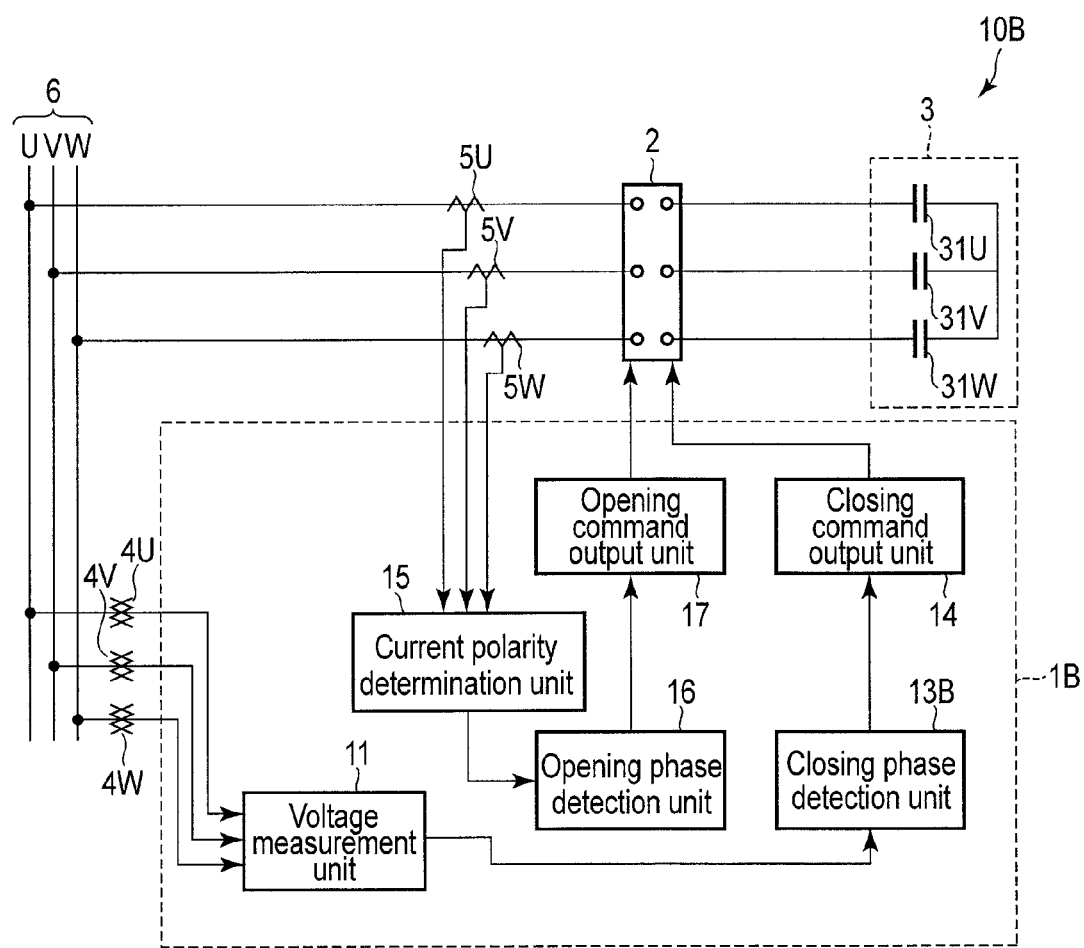
F I G. 12

INRUSH CURRENT SUPPRESSION APPARATUS

CROSS REFERENCE TO RELATED APPLICATIONS

This application is a Continuation application of PCT Application No. PCT/JP2011/071328, filed Sep. 20, 2011 and based upon and claiming the benefit of priority from Japanese Patent Application No. 2010-212624, filed Sep. 22, 2010, the entire contents of all of which are incorporated herein by reference.

FIELD

Embodiments described herein relate generally to an inrush current suppression apparatus that suppresses an inrush current generated when a circuit breaker is closed.

BACKGROUND

It is generally known that when a shunt capacitor is connected by a circuit breaker, a large inrush current flows depending on a closing phase. In Japan, a series reactor whose capacity is 6% of capacitance of the capacitor is inserted to suppress the magnitude of the inrush current. However, the capacitance of the shunt capacitor increases with the increasing capacity of a system, and the inrush current tends to increase.

The shunt capacitor is connected/disconnected more than once a day in response to load variations. The electrical life of the circuit breaker used to connect/disconnect the shunt capacitor is important. The electrical life of the circuit breaker is greatly affected by the wearing away of an arcing contact and a nozzle of the circuit breaker. The condition that determines the electrical life of the circuit breaker which connects/disconnects the shunt capacitor is dominated by erosion resulting from pre-arcing discharge at the time of the closing of the circuit breaker.

In order to suppress a magnetizing inrush current that flows when a voltage transformer is energized, it is known to use a circuit breaker having a structure in which a resistor-equipped circuit breaker including a closing resistance and a contact that are connected in series is connected in parallel to a circuit breaker main contact. This circuit breaker closes the resistor-equipped circuit breaker prior to the circuit breaker main contact and thereby suppresses the magnetizing inrush current.

However, the size increase of the circuit breaker configured to have the resistor-equipped circuit breaker is inevitable. The shunt capacitor is often disposed in a power system of a voltage class of, for example, 66 or 77 kV. In these voltage classes, most circuit breakers are a three-phase collective operation type. The three-phase collective operation type circuit breaker closes all three phases at the same time. When three phases of shunt capacitors are connected at the same time, the suppression of an inrush current is difficult.

BRIEF DESCRIPTION OF THE DRAWINGS

FIG. 9 is a waveform chart showing absolute values of the respective phases of the circuit breaker currents after the closing of the circuit breaker in a given closing phase;

FIG. 10 is a graph showing the changes of charge of the respective phases during pre-arcing discharge period when the circuit breaker is closed in the given closing phase;

FIG. 11 is a block diagram showing a structure of a power system to which a circuit breaker control apparatus according to a second embodiment of the invention is applied;

FIG. 12 is a block diagram showing a structure of a power system to which a circuit breaker control apparatus according to a third embodiment of the invention is applied.

DETAILED DESCRIPTION

Various Embodiments will be described hereinafter with reference to the accompanying drawings.

In general, according to one embodiment, there is provided an inrush current suppression apparatus that suppresses an inrush current generated when three phases of shunt capacitors are connected at the same time to a three-phase alternating current power system on a power source side by a circuit breaker. The inrush current suppression apparatus includes a power source voltage measurement unit configured to measure power source voltages which are voltages on the power source side of the circuit breaker; a circuit breaker current measurement unit configured to measure circuit breaker currents which are currents flowing through the circuit breaker; a residual voltage polarity determination unit configured to determine the polarities of residual voltages on a shunt capacitor side of the circuit breaker after the opening of the circuit breaker in accordance with the circuit breaker currents measured by the circuit breaker current measurement unit; a closing phase section detector configured to detect a closing phase section in which the polarities of the residual voltages determined by the residual voltage polarity determination unit match the polarities of the power source voltages measured by the power source voltage measurement unit; and a circuit breaker closing unit configured to close the circuit breaker within the closing phase section detected by the closing phase section detector.

First Embodiment

Figure 1:
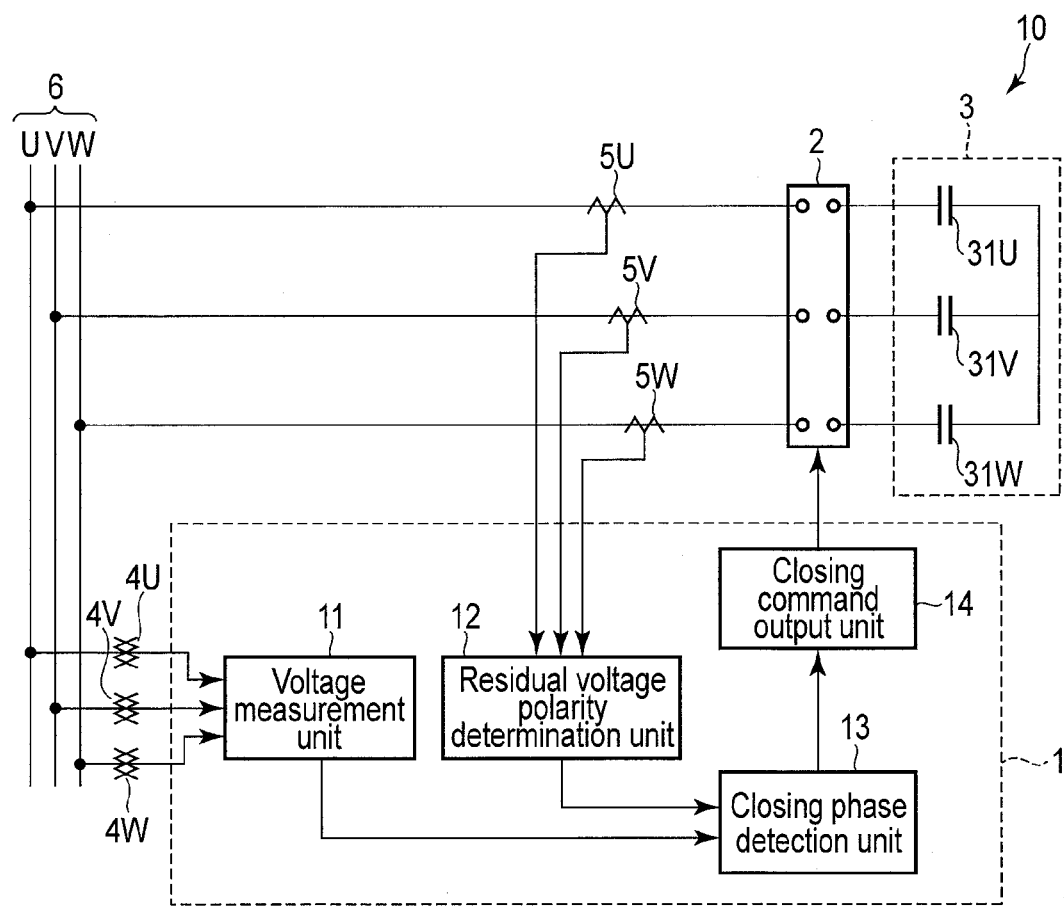
FIG. 1 is a block diagram showing a structure of a power system to which a circuit breaker control apparatus according to a first embodiment of the invention is applied.

FIG. 1 is a block diagram showing a structure of a power system 10 to which a circuit breaker control apparatus 1 according to a first embodiment of the invention is applied. Like parts in the following drawings are indicated by like reference signs and are not described in detail, and differences are mainly described. Repeated explanations are not given in the following embodiments either.

The power system 10 includes the circuit breaker control apparatus 1, a circuit breaker 2, phase modifying equipment 3, voltage detectors 4U, 4V, and 4W, current detectors 5U, 5V, and 5W, and a power source bus 6.

The power source bus 6 is a bus of the power system. Three-phase alternating-current power is supplied to the power source bus 6 from a power source.

The phase modifying equipment 3 is connected to the power source bus 6 via the circuit breaker 2. The phase modifying equipment 3 is a phase advancing load. The phase modifying equipment (capacitor bank) 3 includes three shunt capacitors 31U, 31V, and 31W. The three shunt capacitors 31U, 31V, and 31W are provided in a U-, V-, and W-phase, respectively. The shunt capacitors 31U, 31V, and 31W are neutral ungrounded.

The circuit breaker 2 is a three-phase collective operation type circuit breaker which collectively operates three phases. When the circuit breaker 2 is closed, the phase modifying equipment 3 is connected to the power source bus 6. When the circuit breaker 2 is opened, the phase modifying equipment 3 is electrically disconnected from the power source bus 6.

The voltage detectors 4U, 4V, and 4W are measurement devices to measure, phase by phase, a circuit breaker power-source-side voltage which is a voltage closer to a power source side (the side of the power source bus 6) than the circuit breaker 2. The voltage detectors 4U, 4V, and 4W detect, as measurement information, voltages of the U-, V-, and W-phases, respectively. The voltage detectors 4U, 4V, and 4W output the detected circuit breaker power-source-side voltages to the circuit breaker control apparatus 1. The voltage detectors 4U, 4V, and 4W are instrument voltage transformers (VT) by way of example. The voltage detectors 4U, 4V, and 4W are disposed on the power source bus 6 here, but may be disposed in any place closer to the power source side than the circuit breaker 2.

The current detectors 5U, 5V, and 5W are measurement devices to measure, phase by phase, a circuit breaker current which is a current flowing through the circuit breaker 2. The current detectors 5U, 5V, and 5W detect, as measurement information, currents of the U-, V-, and W-phases, respectively.

The current detectors 5U, 5V, and 5W are current transformers (CT) by way of example. The current detectors 5U, 5V, and 5W output the detected circuit breaker currents to the circuit breaker control apparatus 1. The current detectors 5U, 5V, and 5W are disposed on the power source side here, but may be disposed closer to a load side (the side of the phase modifying equipment 3) than the circuit breaker 2. When an existing circuit breaker is modified, CTs, if provided on both sides of this circuit breaker, can be used as the current detectors 5U, 5V, and 5W.

The circuit breaker control apparatus 1 is a controller to control the circuit breaker 2. The circuit breaker control apparatus 1 closes or opens the circuit breaker 2 in accordance with the circuit breaker power-source-side voltages detected by the voltage detectors 4U, 4V, and 4W and the circuit breaker currents detected by the current detectors 5U, 5V, and 5W.

The circuit breaker control apparatus 1 includes a voltage measurement unit 11, a residual voltage polarity determination unit 12, a closing phase detection unit 13, and a closing command output unit 14.

The voltage measurement unit 11 converts voltages to ground of the circuit breaker power-source-side voltages detected by the voltage detectors 4U, 4V, and 4W to phase-to-phase voltages. The voltage measurement unit 11 measures the phase-to-phase voltages obtained by the conversion. The voltage measurement unit 11 outputs the measured phase-to-phase voltages of the circuit breaker power-source-side voltages to the closing phase detection unit 13.

In accordance with the circuit breaker currents detected by the current detectors 5U, 5V, and 5W, the residual voltage polarity determination unit 12 estimates the polarities of direct-current voltages (residual voltages of the shunt capacitors 31U, 31V, and 31W) remaining on the load side of the circuit breaker 2 after the opening of the circuit breaker 2. The residual voltage polarity determination unit 12 outputs the estimated polarity of the residual voltage to the closing phase detection unit 13.

Figure 2:
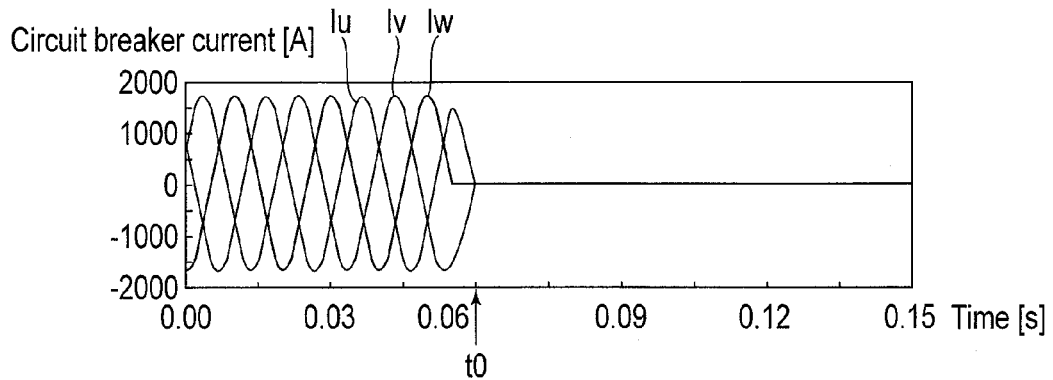
FIG. 2 is a waveform chart showing circuit breaker currents flowing through a circuit breaker in a one-line ground state.
Figure 3:
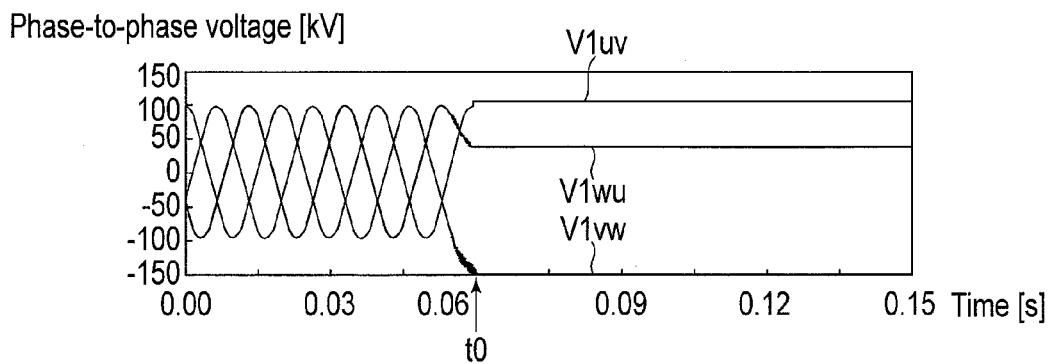
FIG. 3 is a waveform chart showing phase-to-phase voltages applied to a load side of the circuit breaker in the one-line ground state.

Referring to FIG. 2 and FIG. 3, how the residual voltage polarity determination unit 12 estimates the polarity of the residual voltage is described. Here, how the polarity of the residual voltage is estimated when the circuit breaker 2 is opened with a one-line ground is described. It should be noted that the same applies to how the polarity of the residual voltage is estimated when the circuit breaker 2 is opened in a steady state.

FIG. 2 is a waveform chart showing circuit breaker currents Iu, Iv, and Iw flowing through the circuit breaker 2 in a one-line ground (W-phase ground) state.

FIG. 3 is a waveform chart showing phase-to-phase voltages V1$uv$, V1$vw$, and V1$wu$ applied to the load side of the circuit breaker 2 in the one-line ground (W-phase ground) state. In FIG. 2 and FIG. 3, a time t0 indicates an open point of the circuit breaker 2. First, how to estimate the polarity of the residual voltage V1$uv$ between the U- and V phases is described.

The residual voltage polarity determination unit 12 estimates the polarity of the residual voltage V1$uv$ between the U- and V phases in accordance with the U-phase circuit breaker current Iu.

The residual voltage polarity determination unit 12 determines the polarity of the half wave of the circuit breaker current Iu immediately before a interrupting zero point t0. Referring to FIG. 2, the polarity of the half wave of the circuit breaker current Iu immediately before the interrupting zero point t0 is positive. The residual voltage polarity determination unit 12 estimates that the polarity of the residual voltage V1$uv$ between the U- and V phases is the same as the determined polarity of the circuit breaker current Iu. That is, the residual voltage polarity determination unit 12 estimates that the polarity of the residual voltage V1$uv$ between the U- and V phases is positive. Referring to FIG. 3, the polarity of the residual voltage V1$uv$ between the U- and V phases is positive. Thus, the polarity of the residual voltage V1$uv$ between the U- and V phases shown in FIG. 3 matches the result of estimation by the residual voltage polarity determination unit 12.

Similarly, the residual voltage polarity determination unit 12 estimates the polarity of the residual voltage V1$vw$ between the v- and w phases in accordance with the result of determining the polarity of the half wave of the circuit breaker current Iv immediately before the interrupting zero point t0. The residual voltage polarity determination unit 12 also estimates the polarity of the residual voltage V1$wu$ between the W- and U phases in accordance with the result of determining the polarity of the half wave of the circuit breaker current Iw immediately before the interrupting zero point t0.

Here, advantages of estimating the polarities of the respective phase-to-phases of the residual voltages V1$uv$, V1$vw$, and V1$wu$ in accordance with the polarities of the respective phases of the circuit breaker currents Iu, Iv, and Iw are described.

Figure 4:
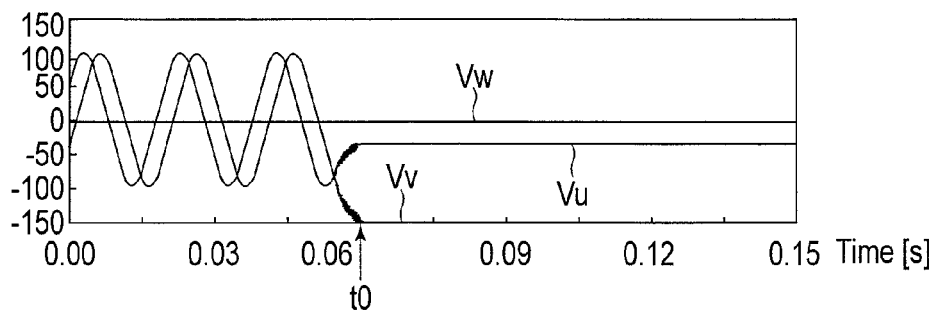
FIG. 4 is a waveform chart showing capacitor voltages to ground in the one-line ground state.

FIG. 4 is a waveform chart showing capacitor voltages to ground (phase voltages on the load side of the circuit breaker 2) Vv, Vu, and Vw in the same state as the one-line ground (W-phase ground) state in FIG. 2 and FIG. 3.

When the circuit breaker 2 interrupts a current in a steady state, the polarity (positive or negative) of the half wave of the circuit breaker current of the respective phases immediately before the interrupting zero point matches the polarity of the capacitor voltages to ground (phase voltages of the residual voltages) of the respective phases immediately after the interrupting zero point. This is because the phases of the currents flowing through the shunt capacitors 31U, 31V, and 31W are 90 degrees ahead of the phases of power source voltages.

However, as shown in FIG. 4, when the circuit breaker 2 interrupts a current in the one-line ground state, the polarities of the half waves of the circuit breaker currents Iu, Iv, and Iw immediately before the interrupting zero point t0 do not necessarily match those of the residual voltages (capacitor voltages to ground immediately after the interrupting zero point) Vv, Vu, and Vw in the respective phases.

On the other hand, as described above, the polarities of the respective phases of the circuit breaker currents Iu, Iv, and Iw immediately before the interrupting zero point t0 match the polarities of the respective phase-to-phases of the residual voltages V1$uv$, V1$vw$, and V1$wu$. Thus, even when the circuit breaker 2 interrupts a fault current in the one-line ground, the residual voltage polarity determination unit 12 can estimate the polarities of respective phase-to-phases of the residual voltages V1$uv$, V1$vw$, and V1$wu$ in accordance with the circuit breaker currents Iu, Iv, and Iw.

The closing phase detection unit 13 detects a closing phase in which to close the circuit breaker 2, in accordance with the phase-to-phase voltages of the circuit breaker power-source-side voltages measured by the voltage measurement unit 11 and in accordance with the phase-to-phase residual voltages estimated by the residual voltage polarity determination unit 12.

Figure 5:
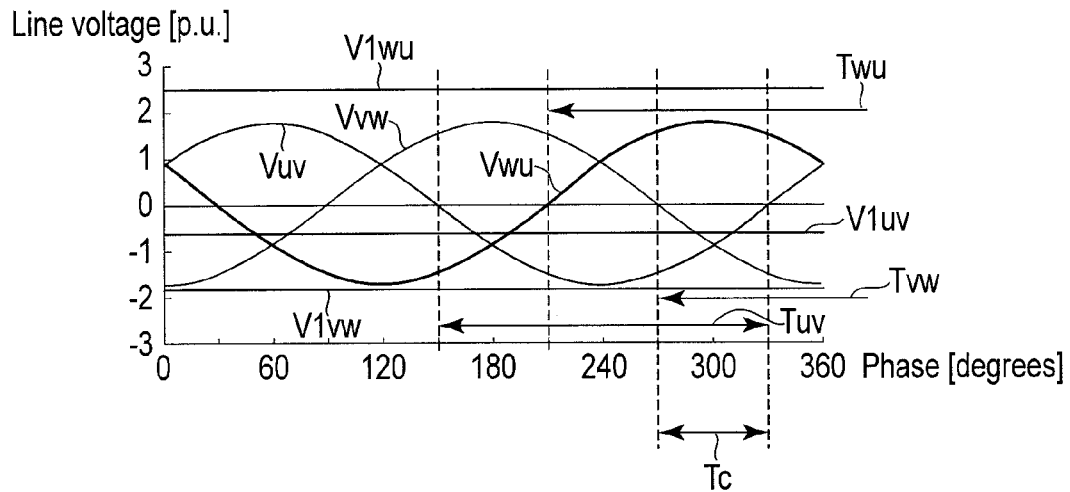
FIG. 5 is a waveform chart showing voltage waveforms illustrating a method of detecting a closing phase by a closing phase detector according to the present embodiment.

Referring to FIG. 5, how the closing phase detection unit 13 detects the closing phase is described.

The closing phase detection unit 13 detects a section Tuv in which the polarity of a circuit breaker power-source-side voltage Vuv between the U- and V phases match the polarity of the residual voltage V1$uv$ between the U- and V phases. The closing phase detection unit 13 detects a section Tvw in which the polarity of a circuit breaker power-source-side voltage Vvw between the V- and W phases matches the polarity of a residual voltage V1$vw$ between the V- and W phases. The closing phase detection unit 13 detects a section Twu in which the polarity of a circuit breaker power-source-side voltage Vwu between the W- and U phases matches the polarity of a residual voltage V1$wu$ between the W- and U phases.

The closing phase detection unit 13 detects a section Tc in which all the sections Tuv, Tvw, and Twu detected in the respective phases overlap. The closing phase detection unit 13 sets the detected section Tc as an object phase region to be closed. The object phase region Tc to be closed is an object region of a point (closing phase) at which to close the circuit breaker 2. The closing phase detection unit 13 outputs the detected object phase region Tc to be closed to the closing command output unit 14.

The closing command output unit 14 outputs a closing command to the circuit breaker 2 to close the circuit breaker 2 within the object phase region Tc to be closed detected by the closing phase detection unit 13. As a result, the circuit breaker 2 is closed at a point within the object phase region Tc to be closed.

Figure 6:
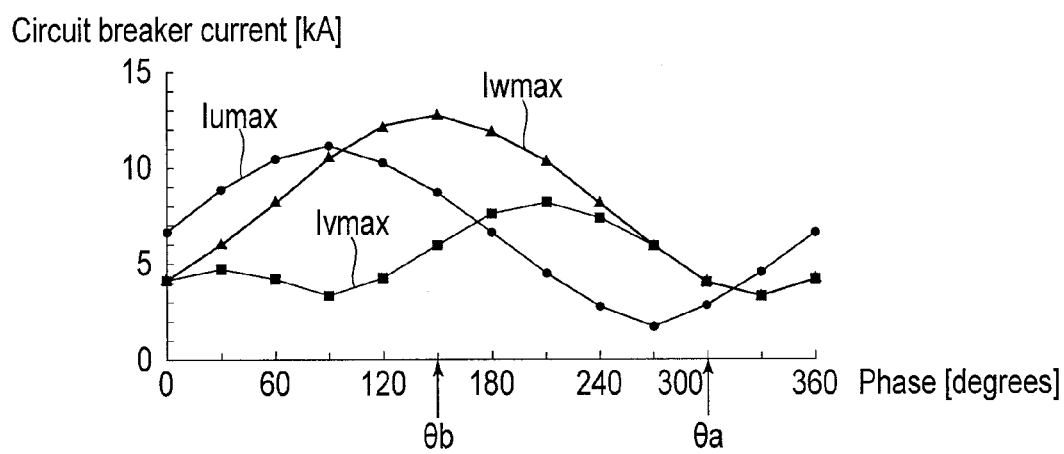
FIG. 6 is a graph showing the correlation between a closing phase and the maximum value of a circuit breaker current in each phase.

FIG. 6 is a graph showing the correlation between the closing phase and the maximum value of the circuit breaker current in each phase when the circuit breaker 2 is closed under conditions of the residual voltages V1$uv$, V1$vw$, and V1$wu$ and the circuit breaker power-source-side voltages Vuv, Vvw, and Vwu shown in FIG. 5. A graph curve Iumax indicates the maximum value of a U-phase circuit breaker current. A graph curve Ivmax indicates the maximum value of a V-phase circuit breaker current. A graph curve Iwmax indicates the maximum value of a W-phase circuit breaker current.

Under closing conditions of the circuit breaker 2 in FIG. 6, the rated voltage of the power source bus 6 is 66 kV, the capacities of the shunt capacitors 31U, 31V, and 31W are 120 MVA, the series reactors that account for 6% of the capacities of the capacitors are present, the shunt capacitors 31U, 31V, and 31W are neutral ungrounded, and three phases are closed at the same time.

A closing phase θa indicates the center of the object phase region Tc to be closed detected by the closing phase detection unit 13.

As shown in FIG. 6, the maximum value of the circuit breaker current in each phase when the circuit breaker 2 is closed in the closing phase θa is suppressed to about half to about one third of the maximum value of the circuit breaker current in each phase when the circuit breaker 2 is closed in a closing phase θb.

Figure 7:
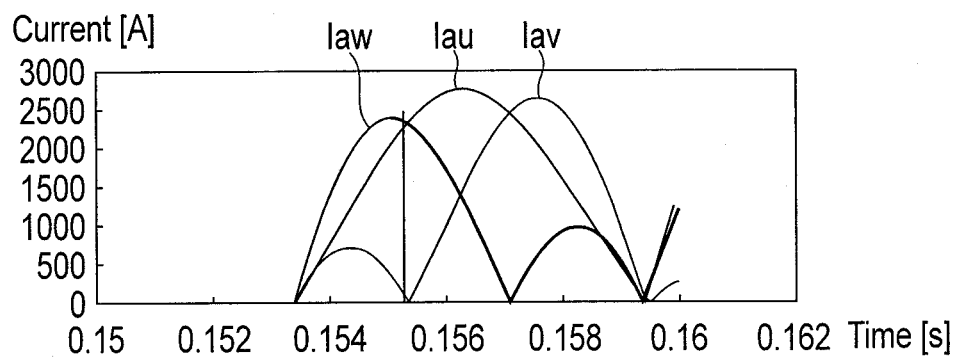
FIG. 7 is a waveform chart showing absolute values of the respective phases of the circuit breaker currents after the closing of the circuit breaker in the closing phase according to the present embodiment.
Figure 8:
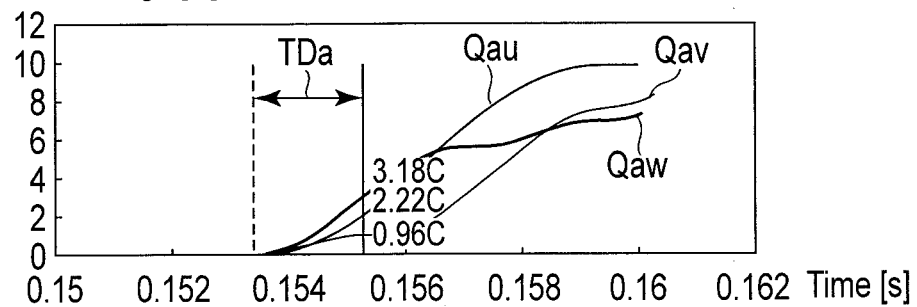
FIG. 8 is a graph showing the changes of charge of the respective phases during pre-arcing discharge period when the circuit breaker is closed in the closing phase according to the present embodiment.

FIG. 7 is a waveform chart showing absolute values Iau, Iav, and Iaw of the respective phases of the circuit breaker currents after the closing of the circuit breaker 2 in the closing phase θa in FIG. 6. FIG. 8 is a graph showing the changes of charge Qau, Qav, and Qaw of the respective phases during pre-arcing discharge period TDa when the circuit breaker 2 is closed in the closing phase θa in FIG. 6. The pre-arcing discharge period TDa is 1.91 milliseconds.

FIG. 9 is a waveform chart showing absolute values Ibu, Ibv, and Ibw of the respective phases of the circuit breaker currents after the closing of the circuit breaker 2 in the closing phase θb in FIG. 6. FIG. 10 is a graph showing the changes of charge Qbu, Qbv, and Qbw of the respective phases during pre-arcing discharge period TDb when the circuit breaker 2 is closed in the closing phase θb in FIG. 6. The pre-arcing discharge period TDb is 4.70 milliseconds.

In the graphs of FIG. 8 to FIG. 10, the relation of the circuit breaker 2 at the time of closing between the electrode gap distance and a voltage generated by pre-arcing discharge is under the same condition.

As shown in FIG. 8 to FIG. 10, the charges Qau, Qav, and Qaw of the respective phases resulting from the closing of the circuit breaker 2 in the closing phase θa vary by phase, but are reduced to about one tenth of the charges Qbu, Qbv, and Qbw of the respective phases resulting from the closing of the circuit breaker 2 in the closing phase θb.

According to the present embodiment, the three-phase collective operation type circuit breaker 2 can suppress an inrush current generated even when the phase modifying equipment 3 comprising the shunt capacitors 31U, 31V, and 31W is connected.

The electrical life of the circuit breaker 2 which is opened/closed on the shunt capacitors 31U, 31V, and 31W is greatly affected by the wearing away of an arcing contact and a nozzle, and is dominated by erosion resulting from pre-arcing discharge at the time of the closing of the circuit breaker. The erosion of the arcing contact increases with the increase in the amount of current-carrying charge. The circuit breaker control apparatus 1 controls the phase at the time of the disconnecting of the phase modifying equipment 3, and can thereby reduce the erosion of the arcing contact of the circuit breaker 2. Therefore, the electrical life of the circuit breaker 2 can be prolonged.

Furthermore, the circuit breaker control apparatus 1 can determine the optimum closing phase which suppresses the inrush current for the next closing of the circuit breaker 2 by determining the polarity of the direct-current voltage remaining on the load side of the circuit breaker 2 without measuring the magnitude of this direct-current voltage.

Second Embodiment

FIG. 11 is a block diagram showing a structure of a power system 10A to which a circuit breaker control apparatus 1A according to a second embodiment of the invention is applied.

In the power system 10A, the circuit breaker control apparatus 1 in the power system 10 according to the first embodiment shown in FIG. 1 is replaced by the circuit breaker control apparatus 1A, and the current detectors 5U, 5V, and 5W are replaced by voltage detectors 6U, 6V, and 6W. The other structure is similar to the first embodiment.

The voltage detectors 6U, 6V, and 6W are measurement devices to measure, phase by phase, a load side voltage which is a voltage closer to a load side (the side of phase modifying equipment 3) than a circuit breaker 2. The voltage detectors 6U, 6V, and 6W detect, as measurement information, voltages of the U-, V-, and W-phases, respectively. The voltage detectors 6U, 6V, and 6W output the detected load side voltages to the circuit breaker control apparatus 1A. The voltage detectors 6U, 6V, and 6W are instrument voltage transformers by way of example.

In the circuit breaker control apparatus 1A, the residual voltage polarity determination unit 12 in the circuit breaker control apparatus 1 according to the first embodiment is replaced by a residual voltage polarity determination unit 12A. The other structure is similar to the first embodiment.

The residual voltage polarity determination unit 12A converts voltages to ground of the load side voltages detected by the voltage detectors 6U, 6V, and 6W to phase-to-phase voltages. The residual voltage polarity determination unit 12A measures the phase-to-phase voltages obtained by the conversion.

When the circuit breaker 2 is opened, the residual voltage polarity determination unit 12A estimates the polarities of the phase-to-phases of direct-current voltages (residual voltages of the shunt capacitors 31U, 31V, and 31W) remaining on the load side of the circuit breaker 2 in accordance with the phase-to-phase voltages of the measured load side voltages. The residual voltage polarity determination unit 12A outputs the estimated polarities of the residual voltages to a closing phase detection unit 13.

The polarity of the residual voltage is estimated in the following manner.

The residual voltage polarity determination unit 12A determines the polarity of the phase-to-phase voltage of the load side voltage immediately before a interrupting zero point in accordance with the measured phase-to-phase voltage of the load side voltage. The residual voltage polarity determination unit 12A estimates that the polarity of the residual voltage of the same phase-to-phase as the phase-to-phase voltage the polarity of which has been determined is the same as the determined polarity. The residual voltage polarity determination unit 12A estimates the polarities of the residual voltages for all the phase-to-phases in this manner.

As in the first embodiment, the circuit breaker control apparatus 1A closes the circuit breaker 2 by using the polarity of the residual voltage estimated by the residual voltage polarity determination unit 12A. That is, the closing phase detection unit 13 detects a closing phase in which to close the circuit breaker 2, in accordance with the phase-to-phase voltages of the circuit breaker power-source-side voltages measured by a voltage measurement unit 11 and in accordance with the phase-to-phase residual voltages estimated by the residual voltage polarity determination unit 12A. The closing command output unit 14 closes the circuit breaker 2 in accordance with the closing phase detected by the closing phase detection unit 13.

According to the present embodiment, the voltage detectors 6U, 6V, and 6W for measuring the load side voltages are provided instead of the current detectors 5U, 5V, and 5W for measuring the circuit breaker currents, so that advantageous effects similar to those according to the first embodiment can be obtained.

Third Embodiment

FIG. 12 is a block diagram showing a structure of a power system 10B to which a circuit breaker control apparatus 1B according to a third embodiment of the invention is applied.

In the power system 10B, the circuit breaker control apparatus 1 in the power system 10 according to the first embodiment shown in FIG. 1 is replaced by the circuit breaker control apparatus 1B. The power system 10B is similar in other respects to the power system 10 according to the first embodiment. The basic structure of the circuit breaker control apparatus 1B is similar to the circuit breaker control apparatus 1 according to the first embodiment.

The circuit breaker control apparatus 1B includes a voltage measurement unit 11, a closing phase detection unit 13B, a closing command output unit 14, a current polarity determination unit 15, an opening phase detection unit 16, and an opening command output unit 17.

The current polarity determination unit 15 determines the polarities of the respective phases of circuit breaker currents detected by current detectors 5U, 5V, and 5W. The current polarity determination unit 15 outputs the determined polarities of the respective phases of the circuit breaker currents to the opening phase detection unit 16.

In accordance with the polarities of the respective phases of the circuit breaker currents determined by the current polarity determination unit 15, the opening phase detection unit 16 detects an opening phase which is the same as a preset phase. The opening phase detection unit 16 outputs the detected opening phase to the opening command output unit 17.

The opening command output unit 17 outputs an opening command to the circuit breaker 2 so that the circuit breaker 2 interrupts a current at the point of the opening phase detected by the opening phase detection unit 16. The opening command output unit 17 opens the circuit breaker 2 in the opening phase detected by the opening phase detection unit 16, whereby the opening phase of the circuit breaker 2 is always the same as the preset phase.

As has been described in the first embodiment, the voltage measurement unit 11 outputs the measured phase-to-phase voltage of the circuit breaker power-source-side voltages to the closing phase detection unit 13B.

In accordance with the phase-to-phase voltage of the circuit breaker power-source-side voltage measured by the voltage measurement unit 11, the closing phase detection unit 13B detects an optimum closing phase (or an object phase region to be closed) that suppresses an inrush current generated when the circuit breaker 2 is closed. The closing phase detection unit 13B outputs the detected closing phase to the closing command output unit 14.

Here, the phase in which the circuit breaker 2 is opened by the opening phase detection unit 16 and the opening command output unit 17 is always the same. Therefore, after the opening of the circuit breaker 2, the polarities of direct-current voltages (residual voltages) remaining on the load side (phase modifying equipment 3) of the circuit breaker 2 are also always the same. As a result, the polarities of the residual voltages after the opening of the circuit breaker 2 can be set in advance. Thus, as in the first embodiment, if the circuit breaker power-source-side voltage is measured, the closing phase detection unit 133 can detect the optimum closing phase (or the object phase region to be closed) that suppresses the inrush current generated when the circuit breaker 2 is closed.

The closing command output unit 14 outputs a closing command to the circuit breaker 2 to close the circuit breaker 2 in the closing phase (or the object phase region Tc to be closed) detected by the closing phase detection unit 13B.

According to the present embodiment, a point at which the circuit breaker 2 interrupts a current can be a point in a preset time by the opening phase detection unit 16 and the opening command output unit 17. Thus, the polarities of the residual voltages of the phase modifying equipment 3 can also be preset polarities.

Consequently, the circuit breaker control apparatus 1B can provide advantageous effects similar to those according to the first embodiment by controlling the closing phase of the circuit breaker 2 in accordance with the circuit breaker power-source-side voltages without estimating the polarities of the residual voltages of the phase modifying equipment 3.

Fourth Embodiment

Figure 13:
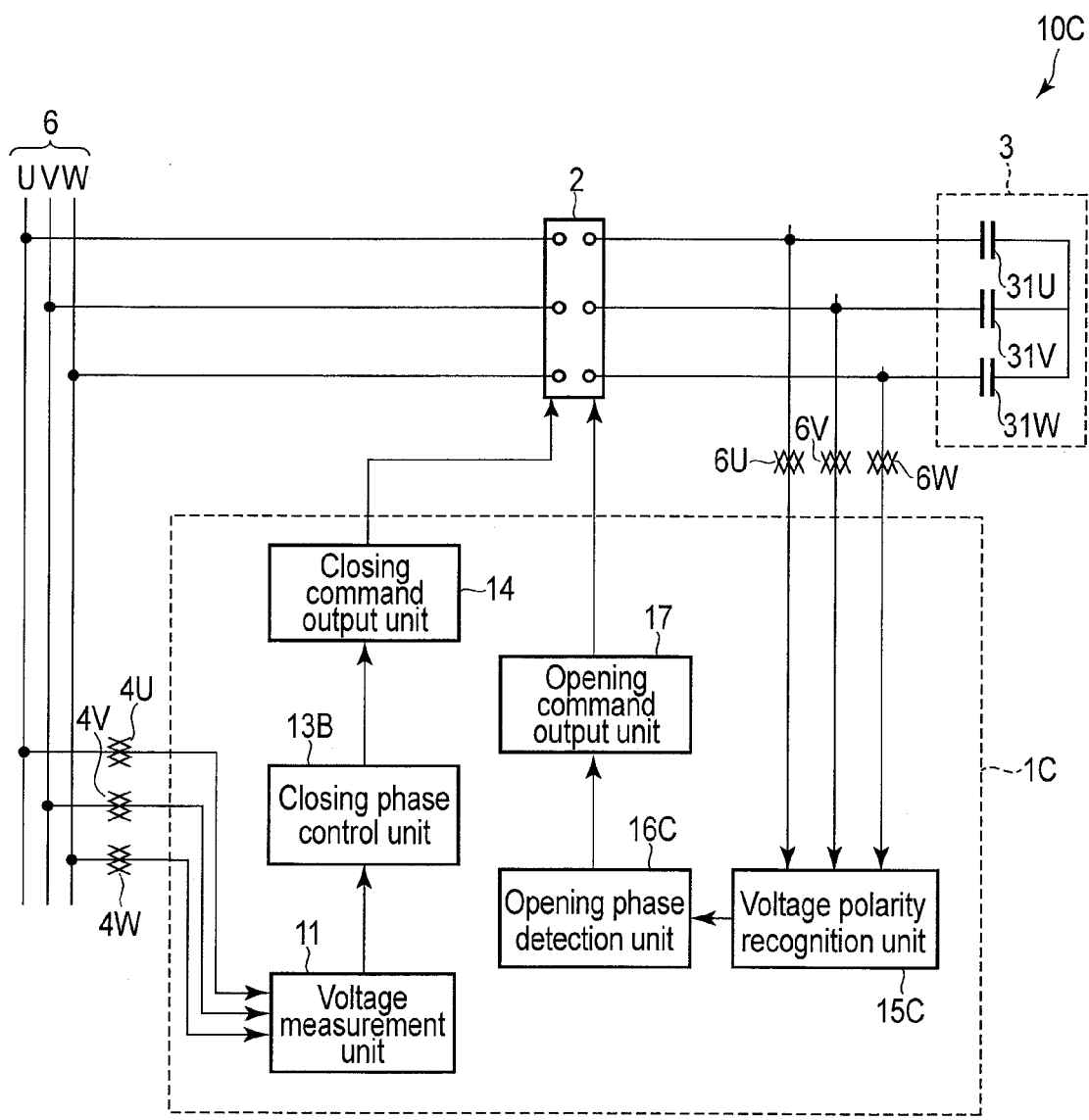
FIG. 13 is a block diagram showing a structure of a power system to which a circuit breaker control apparatus according to a fourth embodiment of the invention is applied.

FIG. 13 is a block diagram showing a structure of a power system 100 to which a circuit breaker control apparatus 10 according to a fourth embodiment of the invention is applied.

In the power system 100, the circuit breaker control apparatus 1B in the power system 10B according to the third embodiment shown in FIG. 12 is replaced by the circuit breaker control apparatus 10, and the current detectors 5U, 5V, and 5W are replaced by the voltage detectors 6U, 6V, and 6W according to the second embodiment. The other structure is similar to the third embodiment.

In the circuit breaker control apparatus 10, the current polarity determination unit 15 in the circuit breaker control apparatus 1B according to the third embodiment shown in FIG. 12 is replaced by a voltage polarity determination unit 15C, and the opening phase detection unit 16 is replaced by an opening polarity detection unit 16C. The other structure is similar to the third embodiment.

The voltage polarity determination unit 15C converts voltages to ground of load side voltages detected by the voltage detectors 6U, 6V, and 6W to phase-to-phase voltages. The voltage polarity determination unit 15C measures the phase-to-phase voltages obtained by the conversion. The voltage polarity determination unit 15C determines the measured polarities of the phase-to-phases of the load side voltages. The voltage polarity determination unit 15C outputs the determined polarities of the phase-to-phases of the load side voltages to the opening polarity detection unit 16C.

In accordance with the polarities of the phase-to-phases of the load side voltages determined by the voltage polarity determination unit 15C, the opening polarity detection unit 16C detects an opening phase which is the same as a preset phase. The opening polarity detection unit 16C outputs the detected opening phase to the opening command output unit 17.

The opening command output unit 17 outputs an opening command to the circuit breaker 2 so that the circuit breaker 2 interrupts currents at the point of the opening phase detected by the opening polarity detection unit 16C. The opening command output unit 17 opens the circuit breaker 2 in the opening phase detected by the opening polarity detection unit 16C so that the opening phase of the circuit breaker 2 is always the same as the preset phase.

The operation of closing the circuit breaker 2 by the voltage measurement unit 11, the closing phase detection unit 13B, and the closing command output unit 14 is similar to that in the third embodiment.

According to the present embodiment, advantageous effects similar to those according to the third embodiment can also be obtained by the use of the voltage detectors 6U, 6V, and 6W instead of the current detectors 5U, 5V, and 5W.

Although the voltage detectors 4U, 4V, and 4W which detect voltages to ground (phase voltages) are used in the embodiments, voltage detectors which detect phase-to-phase voltages may be used instead. In this case, the voltage measurement unit 11 can omit the calculation for converting voltages to ground to phase-to-phase voltages. If a closing phase is determined by substantially the same method as the method of determining the closing phase shown in FIG. 5, the circuit breaker control apparatus 1 does not always have to calculate phase-to-phase voltages.

In the embodiments, the residual voltage polarity determination unit 12 estimates the polarities of the respective phase-to-phases of the residual voltages $V1uv$, $V1vw$, and $V1wu$ in accordance with the circuit breaker currents Iu, Iv, and Iw of the respective phases. However, if currents are interrupted by the circuit breaker 2 in a steady state, the residual voltages of the respective phases can be estimated in accordance with the circuit breaker currents Iu, Iv, and Iw of the respective phases, as has been described in the first embodiment. In this case, if a section in which the polarities of the respective phase voltages on the circuit breaker power source side match in all phases to the estimated polarities of the respective phases of the residual voltages is set as the object phase region to be closed to close the circuit breaker 2, the inrush current of the circuit breaker 2 can be suppressed as in the embodiments.

Moreover, although the circuit breaker 2 is a three-phase collective operation type circuit breaker in the embodiments, similar advantageous effects can also be obtained if three single-phase circuit breakers are provided in the respective phases and the three phases are closed at the same time.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inrush current suppression apparatus that suppresses an inrush current generated when three phases of shunt capacitors are connected at the same time to a three-phase alternating current power system on a power source side by a three-phase collective operation type circuit breaker which collectively operates three phases, the apparatus comprising:
   a power source voltage measurement unit configured to measure power source voltages which are voltages on the power source side of the circuit breaker;
   a circuit breaker current measurement unit configured to measure circuit breaker currents which are currents flowing through the circuit breaker;
   a residual voltage polarity determination unit configured to determine the polarities of phase-to-phases of residual voltages on a shunt capacitor side of the circuit breaker after the opening of the circuit breaker in accordance with the circuit breaker currents measured by the circuit breaker current measurement unit;
   a closing phase section detector configured to detect a closing phase section in which the polarities of phase-to-phases of the residual voltages determined by the residual voltage polarity determination unit match the polarities of phase-to-phase voltages of the power source voltages measured by the power source voltage measurement unit, respectively; and
   a circuit breaker closing unit configured to close the circuit breaker within the closing phase section detected by the closing phase section detector.

2. The inrush current suppression apparatus according to claim 1, wherein the residual voltage polarity determination unit determines the polarities of the respective phase-to-phases of the residual voltages in accordance with the polarities of respective phase currents of the circuit breaker currents.

3. An inrush current suppression apparatus that suppresses an inrush current generated when three phases of shunt capacitors are connected at the same time to a three-phase alternating current power system on a power source side by a three-phase collective operation type circuit breaker which collectively operates three phases, the apparatus comprising:
   a power source voltage measurement unit configured to measure power source voltages which are voltages on the power source side of the circuit breaker;
   a shunt-capacitor-side voltage measurement unit configured to measure shunt-capacitor-side voltages which are voltages on a shunt capacitor side of the circuit breaker;
   a residual voltage polarity determination unit configured to determine the polarities of phase-to-phases of residual voltages on the shunt capacitor side of the circuit breaker after the opening of the circuit breaker in accordance with the shunt-capacitor-side voltages measured by the shunt-capacitor-side voltage measurement unit;
   a closing phase section detector configured to detect a closing phase section in which the polarities of phase-to-phases of the residual voltages determined by the residual voltage polarity determination unit match the polarities of phase-to-phase voltages of the power source voltages measured by the power source voltage measurement unit, respectively; and
   a circuit breaker closing unit configured to close the circuit breaker within the closing phase section detected by the closing phase section detector.

4. The inrush current suppression apparatus according to claim 3, wherein the residual voltage polarity determination unit determines the polarities of the respective phase-to-phases of the residual voltages in accordance with the polarities of the respective phase-to-phases of the shunt-capacitor-side voltages.

5. An inrush current suppression apparatus that suppresses an inrush current generated when three phases of shunt-capacitors are connected at the same time to a three-phase alternating current power system on a power source side by a three-phase collective operation type circuit breaker which collectively operates three phases, the apparatus comprising:
   a power source voltage measurement unit configured to measure power source voltages which are voltages on the power source side of the circuit breaker;
   a circuit breaker current measurement unit configured to measure circuit breaker currents which are currents flowing through the circuit breaker;
   an opening phase section detector configured to detect, in accordance with the circuit breaker currents measured by the circuit breaker current measurement unit, an opening phase section in which the polarities of phase-to-phases of the residual voltages on the shunt-capacitor side of the circuit breaker after the opening of the circuit breaker match preset polarities;
   a circuit breaker opening unit configured to open the circuit breaker within the opening phase section detected by the opening phase section detector;
   a closing phase section detector configured to detect a closing phase section in which the polarities of phase-to-phase voltages of the power source voltages measured by the power source voltage measurement unit match the preset polarities; and
   a circuit breaker closing unit configured to close the circuit breaker within the closing phase section detected by the closing phase section detector.

6. An inrush current suppression apparatus that suppresses an inrush current generated when three phases of shunt-capacitors are connected at the same time to a three-phase alternating current power system on a power source side by a three-phase collective operation type circuit breaker which collectively operates three phases, the apparatus comprising:
   a power source voltage measurement unit configured to measure power source voltages which are voltages on the power source side of the circuit breaker;
   a shunt-capacitor-side voltage measurement unit configured to measure shunt-capacitor-side voltages which are voltages on a shunt capacitor side of the circuit breaker;
   an opening phase section detector configured to detect, in accordance with the shunt-capacitor-side voltages measured by the shunt-capacitor-side voltage measurement unit, an opening phase section in which the polarities of phase-to-phases of the residual voltages on the shunt capacitor side of the circuit breaker after the opening of the circuit breaker match preset polarities;
   a circuit breaker opening unit configured to open the circuit breaker within the opening phase section detected by the opening phase section detector;
   a closing phase section detector configured to detect a closing phase section in which the polarities of phaseto-phase voltages of the power source voltages measured by the power source voltage measurement unit match the preset polarities; and a circuit breaker closing unit configured to close the circuit breaker within the closing phase section detected by the closing phase section detector.

7. A method of controlling an inrush current suppression apparatus that suppresses an inrush current generated when three phases of shunt capacitors are connected at the same time to a three-phase alternating current power system on a power source side by a three-phase collective operation type circuit breaker which collectively operates three phases, the method comprising:

measuring power source voltages which are voltages on the power source side of the circuit breaker;

measuring circuit breaker currents which are currents flowing through the circuit breaker;

determining the polarities of phase-to-phases of residual voltages on a shunt capacitor side of the circuit breaker after the opening of the circuit breaker in accordance with the measured circuit breaker currents;

detecting a phase section in which the determined polarities of phase-to-phases of the residual voltages match the measured polarities of phase-to-phase voltages of the power source voltages, respectively; and closing the circuit breaker within the detected phase section.

8. A method of controlling an inrush current suppression apparatus that suppresses an inrush current generated when three phases of shunt capacitors are connected at the same time to a three-phase alternating current power system on a power source side by a three-phase collective operation type circuit breaker which collectively operates three phases, the method comprising:

measuring power source voltages which are voltages on the power source side of the circuit breaker;

measuring shunt-capacitor-side voltages which are voltages on a shunt capacitor side of the circuit breaker;

determining the polarities of phase-to-phases of residual voltages on the shunt capacitor side of the circuit breaker after the opening of the circuit breaker in accordance with the measured shunt-capacitor-side voltages;

detecting a phase section in which the determined polarities of phase-to-phases of the residual voltages match the measured polarities of phase-to-phase voltages of the power source voltages, respectively; and closing the circuit breaker within the detected phase section.

9. A method of controlling an inrush current suppression apparatus that suppresses an inrush current generated when three phases of shunt capacitors are connected at the same time to a three-phase alternating current power system on a power source side by a three-phase collective operation type circuit breaker which collectively operates three phases, the method comprising:

measuring power source voltages which are voltages on the power source side of the circuit breaker;

measuring circuit breaker currents which are currents flowing through the circuit breaker;

detecting, in accordance with the measured circuit breaker currents, an opening phase section in which the polarities of phase-to-phases of the residual voltages on the shunt capacitor side of the circuit breaker after the opening of the circuit breaker match preset polarities;

opening the circuit breaker within the detected opening phase section;

detecting a closing phase section in which the measured polarities of phase-to-phase voltages of the power source voltages match the preset polarities; and closing the circuit breaker within the detected closing phase section.

10. A method of controlling an inrush current suppression apparatus that suppresses an inrush current generated when three phases of shunt capacitors are connected at the same time to a three-phase alternating current power system on a power source side by a three-phase collective operation type circuit breaker which collectively operates three phases, the method comprising:

measuring power source voltages which are voltages on the power source side of the circuit breaker;

measuring shunt-capacitor-side voltages which are voltages on a shunt-capacitor side of the circuit breaker;

detecting, in accordance with the measured shunt-capacitor-side voltages, an opening phase section in which the polarities of phase-to-phases of the residual voltages on the shunt capacitor side of the circuit breaker after the opening of the circuit breaker match preset polarities;

opening the circuit breaker within the detected opening phase section;

detecting a closing phase section in which the measured polarities of phase-to-phase voltages of the power source voltages match the preset polarities; and closing the circuit breaker within the detected closing phase section.

* * * * *